United States Patent
Lin

(10) Patent No.: US 11,079,277 B2
(45) Date of Patent: Aug. 3, 2021

(54) SPECTRAL IMAGING DEVICE AND METHOD

(71) Applicant: National Taiwan University, Taipei (TW)

(72) Inventor: Ching-Fuh Lin, Taipei (TW)

(73) Assignee: National Taiwan University, Taipei (TW)

(*) Notice: Subject to any disclaimer, the term of this patent is extended or adjusted under 35 U.S.C. 154(b) by 0 days.

(21) Appl. No.: 16/711,110

(22) Filed: Dec. 11, 2019

(65) Prior Publication Data
US 2021/0123806 A1    Apr. 29, 2021

(30) Foreign Application Priority Data
Oct. 28, 2019 (TW) .................. 108138755

(51) Int. Cl.
*G01J 3/10* (2006.01)
*G02B 21/33* (2006.01)
*G01J 3/28* (2006.01)
*G01J 3/50* (2006.01)

(52) U.S. Cl.
CPC ............ *G01J 3/2823* (2013.01); *G01J 3/10* (2013.01); *G01J 3/501* (2013.01); *G02B 21/33* (2013.01); *G01J 2003/102* (2013.01)

(58) Field of Classification Search
CPC .... G01J 3/2823; G01J 3/501; G01J 2003/104; G01J 2003/2826
See application file for complete search history.

(56) References Cited

U.S. PATENT DOCUMENTS

| | | | | |
|---|---|---|---|---|
| 6,122,042 A | * | 9/2000 | Wunderman | A61B 1/05 356/343 |
| 2008/0174768 A1 | * | 7/2008 | Belz | C07D 487/04 356/73 |
| 2011/0050984 A1 | * | 3/2011 | Schulz | C12M 35/02 348/370 |

* cited by examiner

*Primary Examiner* — Maurice C Smith
(74) *Attorney, Agent, or Firm* — Donald E. Stout; Stout, Uxa & Buyan, LLP

(57) ABSTRACT

The present invention provides a spectral imaging apparatus and method featuring in that spectra are obtained from the captured photographs for composition analysis. In addition, the environment can be protected by using to the spectral imaging device and method. Furthermore, a true color photo can also be obtained.

20 Claims, 7 Drawing Sheets

SPECTRAL IMAGING DEVICE AND METHOD

CROSS-REFERENCE TO RELATED APPLICATIONS

The entire contents of Taiwan Patent Application No. 108138755, filed on Oct. 28, 2019, from which this application claims priority, are expressly incorporated herein by reference.

BACKGROUND OF THE INVENTION

1. Field of the Invention

The present invention relates to a spectral imaging method and a spectral imaging device.

2. Description of Related Art

Like other spectral imaging, hyperspectral imaging collects and processes information from across the electromagnetic spectrum. The goal of hyperspectral imaging is to obtain the spectrum for each pixel in the image of a scene, with the purpose of finding objects, identifying materials, or detecting processes. There are two general branches of spectral imagers. There are push broom scanners and the related whisk broom scanners, which read images over time, and snapshot hyperspectral imaging, which uses a staring array to generate an image in an instant.

Whereas the human eye sees color of visible light in mostly three bands (long wavelengths—perceived as red, medium wavelengths—perceived as green, and short wavelengths—perceived as blue), spectral imaging divides the spectrum into many more bands. This technique of dividing images into bands can be extended beyond the visible. In hyperspectral imaging, the recorded spectra have fine wavelength resolution and cover a wide range of wavelengths. Hyperspectral imaging measures continuous spectral bands, as opposed to multispectral imaging which measures spaced spectral bands.

Engineers build hyperspectral sensors and processing systems for applications in astronomy, agriculture, molecular biology, biomedical imaging, geosciences, physics, and surveillance. Hyperspectral sensors look at objects using a vast portion of the electromagnetic spectrum. Certain objects leave unique 'fingerprints' in the electromagnetic spectrum. Known as spectral signatures, these 'fingerprints' enable identification of the materials that make up a scanned object. For example, a spectral signature for oil helps geologists find new oil fields.

The primary advantage to hyperspectral imaging is that the information of the entire electromagnetic spectrum is captured by each pixel. Information on the entire electromagnetic spectrum between adjacent pixels can be used for high-precision classification purposes. The primary disadvantages are cost and complexity of the system. High-speed computers, high-sensitivity sensors, and mass storage devices are typically essential for analyzing hyperspectral imagery.

This type of shooting is also known as multispectral imaging. In the past, there were three methods in the field. The first method employs a camera with multiple lenses. Each lens uses a filter to remove selected wavelengths and pass a specific band so that a photo can be captured by the camera corresponding to the specific band. This method is quite costly because multiple lenses and filters are required. In order to keep the cost from being too high, the number of lenses and the number of filters are limited to ten, which will result in insufficient spectral resolution. The second method employs several cameras. Each camera also includes a filter through which a specific band of a light filters. This method is more expensive than the first. Due to cost reasons, it usually does not include many cameras, resulting in a coarse spectral resolution. The third method employs a beam splitting device, which uses a prism or includes filters disposed on a flywheel, so as to reduce the cost. However, the entire optical architecture is large, and the required mechanical actions make the imaging time long, which is inconvenient for a field that require real-time data. In addition, to form an overall hyperspectral image, the three multispectral imaging methods require many mechanical actions. This may result in shifts between image pixels, and hence a poor image quality.

For the above reasons, applicant has conceived a new way, which can use and popularize the multispectral imaging in a convenient and low cost manner.

SUMMARY OF THE INVENTION

An object of the present invention is to provide a spectral imaging method and device in which photographs can be taken to perform a spectral analysis. In addition, the method and device can facilitate environmental sanitation protection. Furthermore, the disclosed spectral imaging method and device can obtain a photo with real color.

According to an embodiment of the invention, a spectral imaging device comprises a diode array and an image sensor. The diode array includes N diodes (light-emitting diodes or laser diodes), and each of the diodes emits a light having a wavelength range different from that of other diodes. The image sensor is used to capture a set of images (N images) of an object or a scene having the object over a spectral range. The spectral range is divided into N spectral bands, each of the diodes corresponding to one of the N spectral bands. For each capture, the image sensor captures an image over one of the N spectral bands, and only the diode corresponding to the one of the N spectral bands emits light to provide a light source for capturing the image, and the remaining diodes do not emit light. In addition, the image sensor captures an image of the object or the scene having the object on a condition that all of the N diodes do not emit light.

According to another embodiment of the present invention, a spectral imaging method comprises the steps of: providing a diode array (a light-emitting diode array or a laser diode array) comprising N diodes, wherein N is a positive integer; capturing N images of an object or a scene having the object over a spectral range, wherein the spectral range is divided into N spectral bands, each of the diodes corresponding to one of the N spectral bands, and wherein for each capture, the image sensor captures an image over one of the N spectral bands, and only the diode corresponding to the one of the N spectral bands emits light to provide a light source for capturing the image, and the remaining diodes do not emit light; and capturing an image of the object or the scene having the object on a condition that all of the N diodes do not emit light.

In one embodiment, the spectral imaging method takes an image of the object or the scene having the object on a condition that all of the N diodes do not emit light. This step allows the N images captured by the image sensor can deduct an influence of the background (ambient) light, so that the spectral images exhibit the desired spectral characteristics.

According to another embodiment of the present invention, a specific filter may be disposed on an emitting surface of each diode (light-emitting diode or laser diode). The specific filter is used to filter through a specific band of a light emitted from the diode. Therefore, unwanted wavelength of the light emitted from the light-emitting diode or the laser diode can be absorbed, and the resolution of the spectrum can be improved.

According to an embodiment of the present invention, although the diodes (light emitting diodes or laser diodes) of the diode array emit light in turn, the light emitting diodes or the laser diodes have a very fast response time of 1 µs. Therefore, even if a normal frame rate of the display, i.e., 30 fps (frame per second), is adopted as a reference frame rate, the time required to display a complete image is about 30 ms, and thousands or hundreds of light-emitting diodes or laser diodes can still easily emit light in turn within 30 ms, and the user's eyes are not aware that pictures have been taken with different wavelengths in turn, merely feeling a speed similar to a general photography.

In addition, because the size of each light-emitting diode or laser diode is very small, for example, as small as 500 µm×500 µm or less; therefore, even 100 pieces of light-emitting diode or laser diode are made into a 10×10 array, the overall emitting area is only 5 mm×5 mm And even if 1089 diodes are made into a 33×33 array, the emitting area is only slightly larger than 1 cm×1 cm. If the size of each of the light-emitting diodes (or the laser diode) is as small as 200 µm×200 µm, the entire array area is less than 7 mm×7 mm, and hence the present invention can achieve a small, thin, and light multispectral imaging device.

On the one hand the spectral imaging method and device of the present invention can provide a true color photograph, and on the other hand they also can perform a spectral analysis for each pixel and determine a chemical composition corresponding to the pixel according to the respective spectra of individual pixels. In addition to detecting the chemical composition of the object, the photographs taken by the spectral imaging method and device of the embodiments of the present invention can be used in food safety and environmental protection. Further, the spectral imaging method and device can be used to determine if the color of an object, such as a pigment, a cloth, or a cosmetic is correct.

For example, in terms of food safety, a photo of a hamburger in a photograph or a hamburger printed on a paper is taken by a normal camera. Because a real hamburger and the burger in the photograph reveal the same color and the photo is taken by merely using red, green, and blue colors, it is impossible to distinguish whether the hamburger is real. In contrast, with the technique of the present invention, since the chemical composition of the photograph or paper is different from that of a real hamburger, the spectrum of the real hamburger differs from that of the photograph or paper. Accordingly, the disclosed technique can determine whether it is a real burger or not.

Take another instance, some people use chemicals to make fake rice with the same color as true rice. The photos taken with a normal camera cannot distinguish between true and false. Since the composition of the fake rice is not starch, its spectrum is different from that of real rice (starch), and the technique of the present invention can help consumers to distinguish them. Further, if there is a contaminant in the food, the spectrum of the contaminant is different from the food and therefore the contaminant can be spotted by the technique of the present invention.

DETAILED DESCRIPTION OF THE PREFERRED EMBODIMENT

Reference will now be made in detail to those specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components. Wherever possible, the same or similar reference numbers are used in drawings and the description to refer to the same or like parts.

Figure 1:
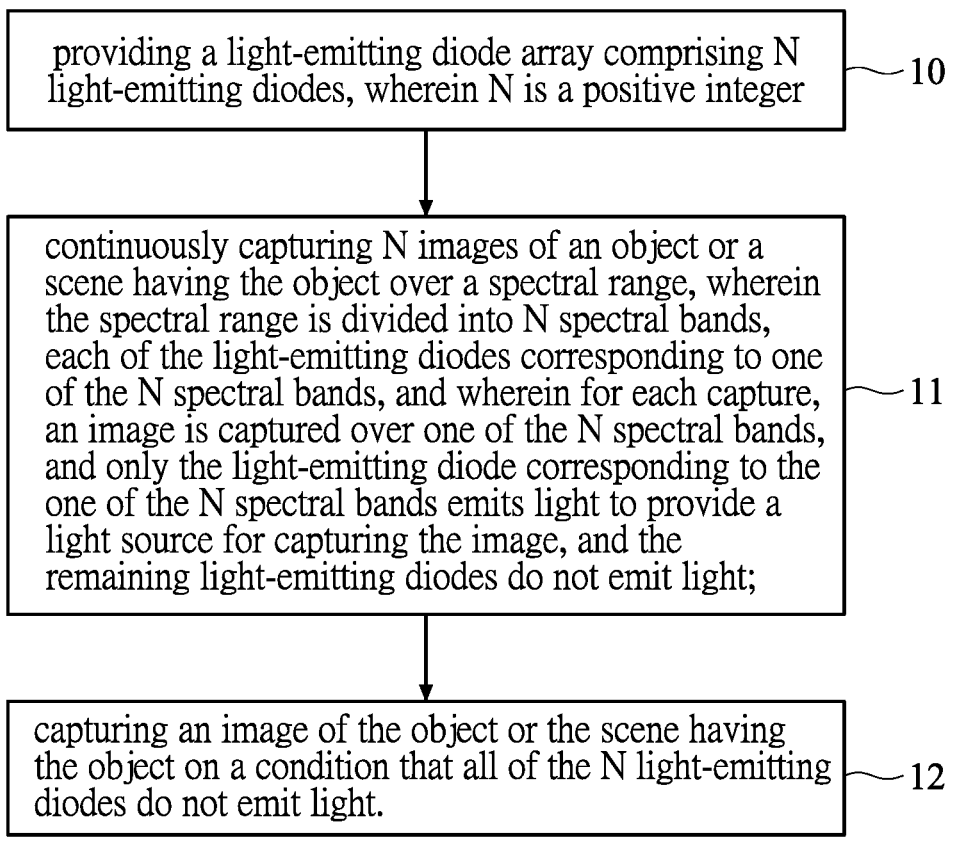
FIG. 1 is a flow chart showing a spectral imaging method in accordance with an embodiment of the present invention.

FIG. 1 is a flow chart showing a spectral imaging method in accordance with an embodiment of the present invention. As shown in FIG. 1, the spectral imaging method comprises: step 10, providing a light-emitting diode array comprising N light-emitting diodes, wherein N is a positive integer; step 11, capturing N images of an object or a scene having the object over a spectral range, wherein the spectral range is divided into N spectral bands, each of the light-emitting diodes corresponding to one of the N spectral bands, and wherein for each capture, an image is captured over one of the N spectral bands, and only the light-emitting diode corresponding to the one of the N spectral bands emits light to provide a light source for capturing the image, and the remaining light-emitting diodes do not emit light; and step 12, capturing an image of the object or the scene having the object on a condition that all of the N light-emitting diodes do not emit light.

In one embodiment, each of the spectral bands has a bandwidth of ≤10 nm. In another embodiment of this invention, the light-emitting diode array is replaced with a laser diode array.

Figure 2:
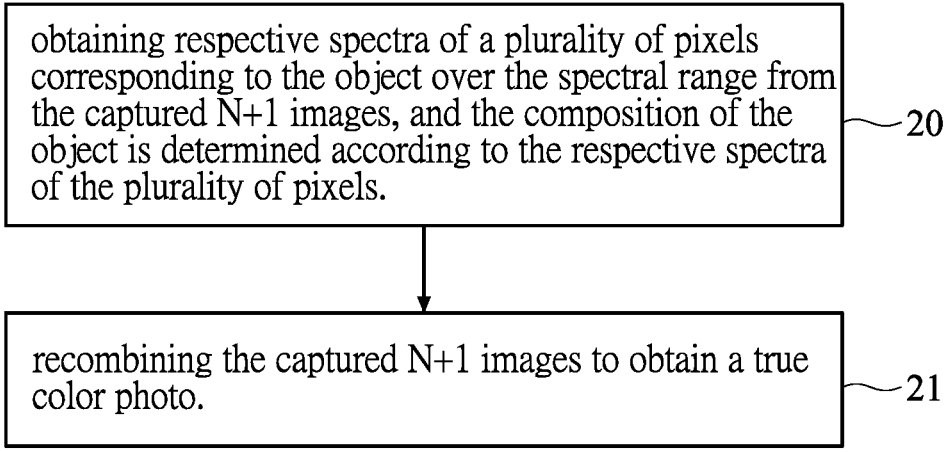
FIG. 2 is a flow chart showing a spectral imaging method in accordance with an embodiment of the present invention.

In one embodiment, in addition to step 10, step 11, and step 12 of FIG. 1, the spectral imaging method further includes step 20 of FIG. 2. In step 20, respective spectra of a plurality of pixels corresponding to the object over the spectral range are obtained from the captured N+1 images, and the composition of the object is determined according to the spectra.

In one embodiment, the spectral imaging method further includes a step to determine what the object is according to the pattern and/or shape of the object from the captured images, and then employing the spectra to analyze the composition of the object and to determine components that the object should have and components that the object should not be present, so that the contaminants included in the object are spotted.

Referring to FIG. 2, in one embodiment, the spectral imaging method further includes step 21 of FIG. 2. In step 21, the captured N+1 images are employed or recombined to obtain a true color photo.

Figure 3:
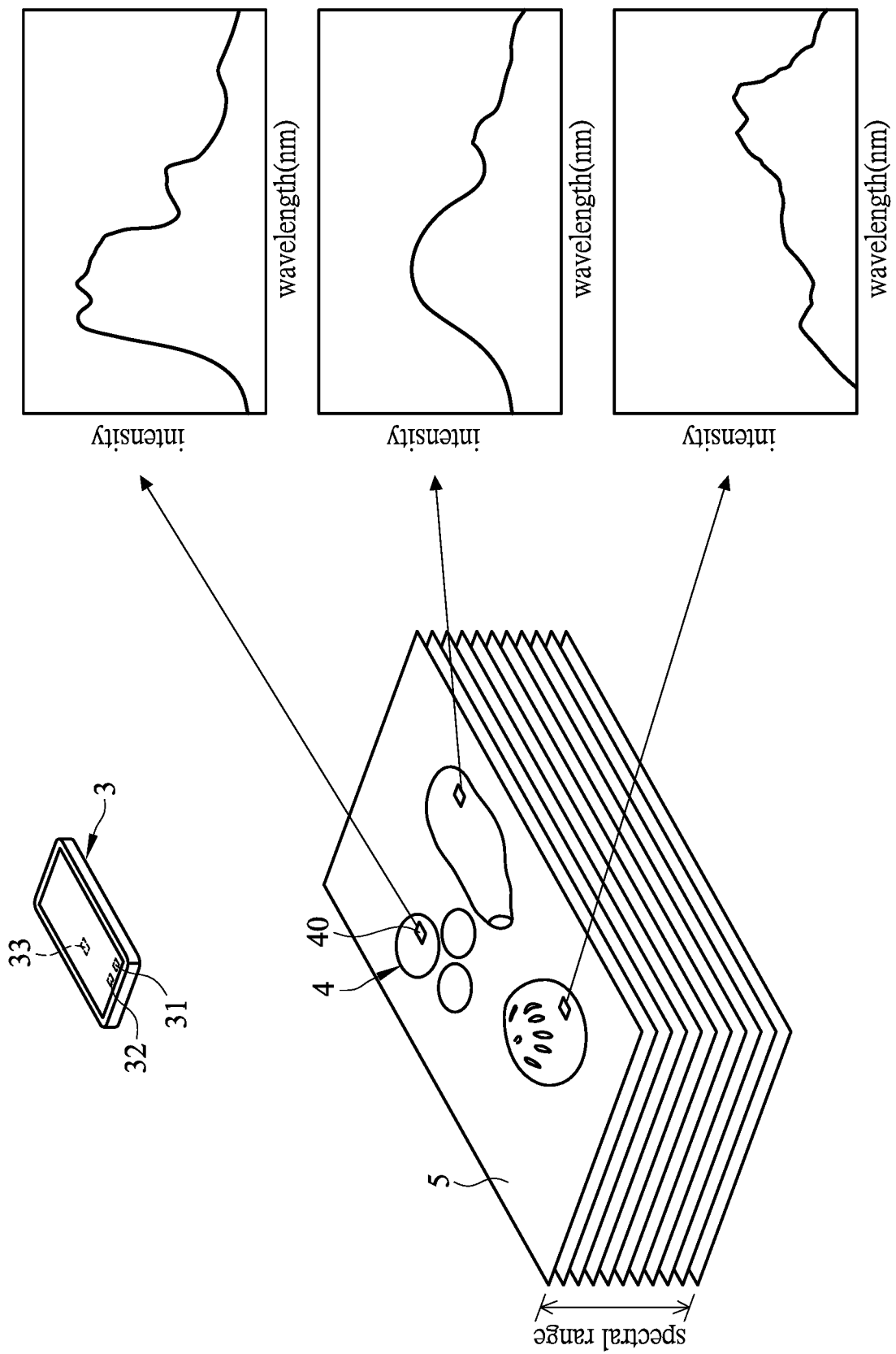
FIG. 3 is a schematic view showing a spectral imaging device according to an embodiment of the present invention.
Figure 4:
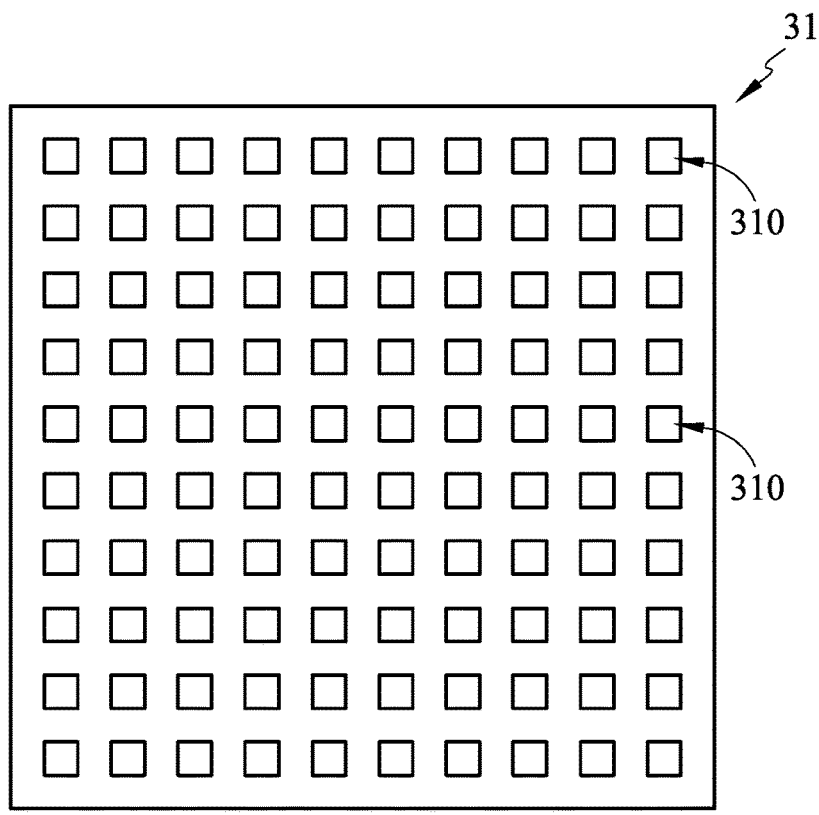
FIG. 4 illustrates a light-emitting diode array in accordance with an embodiment of the present invention.

According to the above method, referring to FIG. 3, the present invention discloses a spectral imaging device 3, characterized by comprising a light emitting diode array 31 (or a laser diode array 31) and an image sensor 32. FIG. 4 illustrates a diode array 31 (a light-emitting diode array or a laser diode array) in accordance with an embodiment of the present invention. As shown in FIG. 4, a diode array 31 includes N diodes 310 (light-emitting diodes 310 or laser diodes 310), and each of the diodes 310 emits a light having a wavelength range different from that of other diodes. The image sensor 31 may be a complementary metal-oxide-semiconductor (CMOS) or a charge coupled device (CCD). The image sensor 31 continuously captures a set of images (N images) of an object or a scene having the object over a spectral range. The spectral range is divided into N spectral bands, each of the diodes 310 corresponding to one of the N spectral bands. For each capture, the image sensor 32 captures an image over one of the N spectral bands, and only the diode 310 corresponding to the one of the N spectral bands emits light to provide a light source for capturing the image, and the remaining diodes 310 do not emit light. In addition, the image sensor 32 captures an image of the object or the scene having the object on a condition that all of the N diodes 310 do not emit light.

In a preferred embodiment, each of the spectral bands has a bandwidth equal to or less than 10 nm. In one embodiment, one or more light-emitting diodes or laser diodes of the diode array 31 employ a filtering structure (not shown) to reduce their bandwidth.

In one embodiment, the above-mentioned filter structure achieves a narrow band, e.g., a bandwidth of 5 nm or 3 nm, by an optical coating. In another embodiment, a narrow band is achieved through metal nanostructures.

Figure 5:
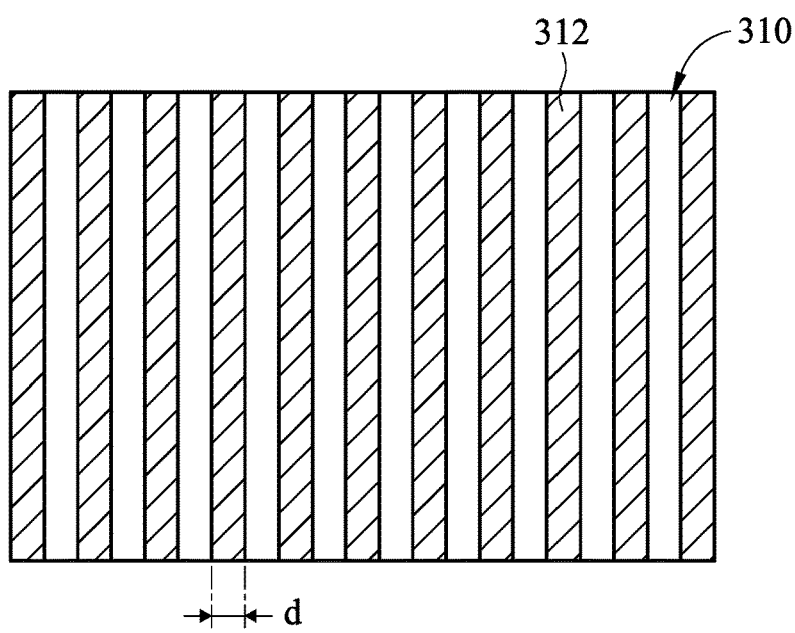
FIG. 5 is a top view showing a metal nano structure in accordance with an embodiment of the present invention.

FIG. 5 is a top view showing metal nanostructures 312 in accordance with an embodiment of the present invention. As shown in FIG. 5, periodically arranged metal nanowires 312 are placed on the light-emitting diode 310, and its light transmission wavelength is related to the dimension of the metal nanowire and obey a relationship: $\lambda = 2n_{\mathit{eff}}d$, where $\lambda$ denotes a wavelength that the light can transmit, d denotes the width of the metal nanowire, and $n_{\mathit{eff}}$ denotes the effective refractive index of the metal nanostructures 312.

In some embodiments of the present invention, each light-emitting diode (LED) or laser diode of the array 31 has a chip dimension greater than 100 μm. In some embodiments of the present invention, the light-emitting diode (LED) array 31 may be a Mini LED Array or a Micro-LED Array. The chip dimension (length) of a mini-LED is between about 50 and 100 microns, while the chip dimension of a micro-LED is about 15 microns. In some embodiments, in order to make the bandwidth of each of the spectral bands narrower, each of the light emitting diodes has a chip dimension between 1 micrometer and 15 micrometer. In some embodiments, a micro-light emitting diode array disclosed in Taiwan Patent Application No. 108127903, entitled "MICRO LIGHT EMITTING DIODE ARRAY AND MANUFACTURING METHOD THEREOF" is used as the light-emitting diode array of the present invention, the entire disclosure of which is incorporated herein by reference.

In this context, "an object" can be a solid, a liquid, or a gas that reflects or emits electromagnetic energy in a unique manner Hyperspectral photography uses these unique spectral features to obtain valuable information that is difficult or impossible to obtain in any other way.

Preferably, the spectral imaging device 3 further includes a processor 33 that obtains respective spectra of the plurality of pixels 40 of the object 4 over the spectral range from the captured N+1 images, and then determines the composition corresponding to the object 4 according to the spectra.

In some embodiments, the spectra are reflection spectra.

In some embodiments, the captured N+1 images are used to detect whether a specific material is present in the object or scene. This detection typically relies on signature-matching techniques, such as spectral matched filtering for known reference spectra.

In some embodiments, quantitative analysis is performed with this detection. In one embodiment, the captured N+1 images are used to measure the amount of chlorophyll in the water, which may indicate the amount of algae present in the water to provide insight into water quality.

In one embodiment, the processor 33 employs or recombines the captured N+1 images to obtain a true color photo.

In one embodiment, the spectral imaging device 3 is a smartphone. In one embodiment, the light-emitting array 31 (or the laser diode array 31) and the image sensor 32 constitute an imaging module. In one embodiment, the light-emitting diode array 31 (or the laser diode array 31) is a built-in light source of the smartphone, an application software in the smartphone controls the lighting order of the light-emitting diodes (or the laser diodes) of the light-emitting diode array 31 (or the laser diode array 31), and the N+1 photographs are captured by the camera of the smartphone.

In one embodiment, the image sensor 32 is an existing component of the smartphone, and the light-emitting diode array 31 (or the laser diode array 31) is a device independent of the smartphone. In one embodiment, the light-emitting diode array 31 (or the laser diode array 31) is disposed outside the smartphone, for example, disposed on a case used for protecting the smartphone. The light-emitting diode array 31 (or the laser diode array 31) is electrically connected to and powered by the power source of the smartphone.

In one embodiment, the user installs an application in the spectral imaging device 3 to control the illuminating order of the diodes 310 of the light-emitting diode array 31 or the laser diode array 31. In one embodiment, the application performs an analysis on the captured images in real time. In another embodiment, the application uploads the captured images to a cloud server and the analysis is performed using software in the cloud server.

On the one hand the spectral imaging method and device of the present invention can provide a true color photograph, and on the other hand they also can perform a spectral analysis for each pixel and determine a chemical composition corresponding to the pixel according to the spectrum of the pixel.

In some embodiments, the N light-emitting diodes or laser diodes alternately emit light and the image sensor 32 captures the N images. In addition, respective intensities of the individual pixels of another image captured by the image sensor 32 in the condition that all N light-emitting diodes or laser diodes do not emit light, are deducted from respective intensities of individual pixels of the N images.

For example, in an image taken by one certain light-emitting diode, the intensity of the pixel 40 ($r_0$, $g_0$, $b_0$) of another image taken on the condition that all light-emitting diodes do not emit light, is subtracted from the intensity of the pixel 40 ($r_0+r_1$, $g_0+g_1$, $b_0+b_1$). The intensity of pixel 40 is ($r_1$, $g_1$, $b_1$) after the subtraction.

The purpose of step 12 of FIG. 1 is to capture a background image with the lighting from the environment, so the N images with respective lighting from individual light-emitting diodes (or laser diodes) can be calibrated by subtracting the lighting effect from the environment. It is also important to mention that the previous step 11 for various light sources should not have automatic adjustment of exposure for each image capture. Instead, the exposure should remain the same for each image capture, so the detected intensity of the image sensor can be traced and used for correct calculation later. If the automatic adjustment of exposure is on, then an unknown constant may be multiplied to the detected intensity of the image sensor. As a result, the value of the intensity of the image sensor cannot be used for calculating the correct spectrum.

Figure 6:
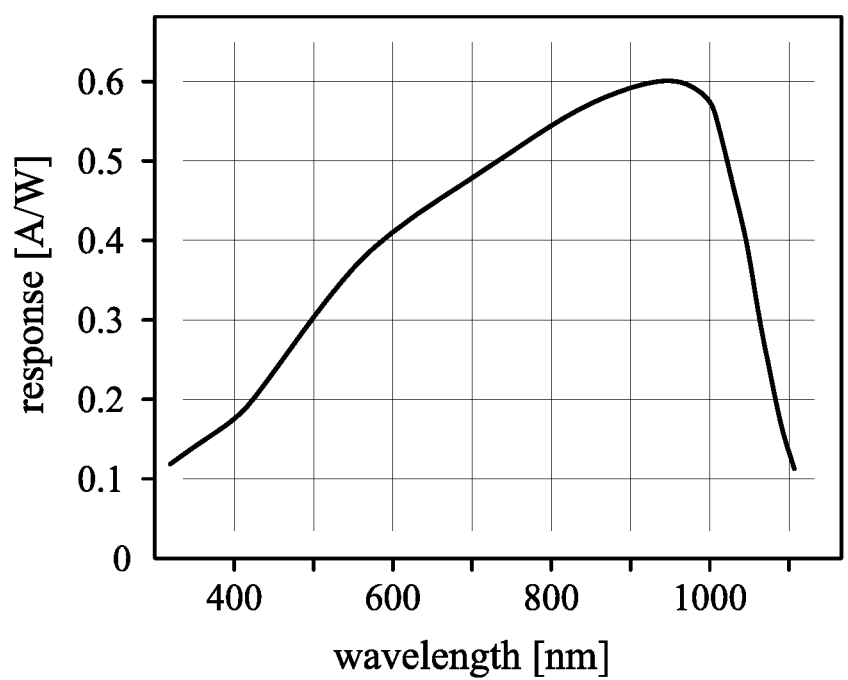
FIG. 6 illustrates a spectral response of an image sensor.

In some embodiments, respective intensities of individual pixels of another image captured by the image sensor 32 on condition that all N light-emitting diodes or laser diodes do not emit light, are deducted from respective intensities of individual pixels of the N images. In addition, the intensity of each pixel is further calibrated based on the spectral response of the image sensor 32. For example, FIG. 6 illustrates the spectral response of an image sensor, and the intensity of each pixel is further calibrated according to the response or relative response of the corresponding wavelength in the spectral response. For example, the intensity of a certain pixel captured at a certain wavelength is divided by the response or relative response corresponding to the certain wavelength of FIG. 6. After the calibration, the affection of the image sensor can be eliminated.

In some embodiments, respective intensities of individual pixels of another image captured by the image sensor 32 in the condition that all N light-emitting diodes or laser diodes do not emit light, are deducted from respective intensities of individual pixels of the N images. In addition, the intensity of each pixel of the N images is further calibrated based on the spectral response of the image sensor 32. Furthermore, the intensity of each pixel of the N images is further calibrated based on the emission spectrum of the corresponding light-emitting diode or laser diode. The calibrating method can be similar to the calibration of the image sensor. Preferably, both calibrations described above are performed.

Through the above calibrating procedure, spectra with characteristics that are not affected by the light source and the response of the image sensor can be obtained; therefore, a spectral matching procedure can be performed to determine the composition corresponding to individual pixels of the object.

The true color photo can be formed by calculating real chromaticity coordinates of each pixel, which are obtained by performing a linear combination for each pixel. For each pixel, respective intensities of individual wavelengths over the spectral range are linearly combined. Such that a complete true color photo can be obtained.

Figure 7A:
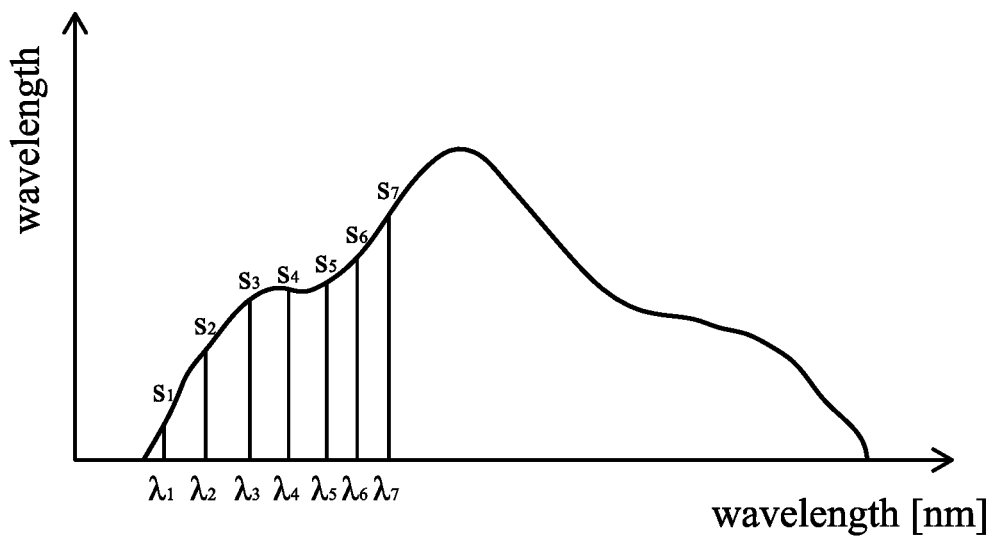
FIG. 7A is a spectrum of a pixel over a spectral range obtained from captured N+1 images according to an embodiment of the present invention.
Figure 7B:
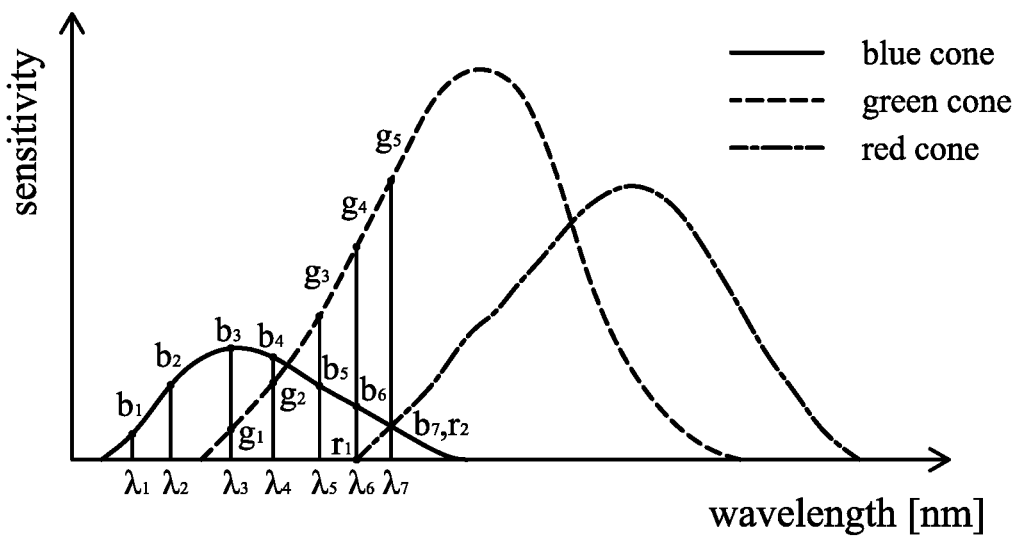
FIG. 7B is the spectral sensitivity spectrum of the human eye.
Figure 7C:
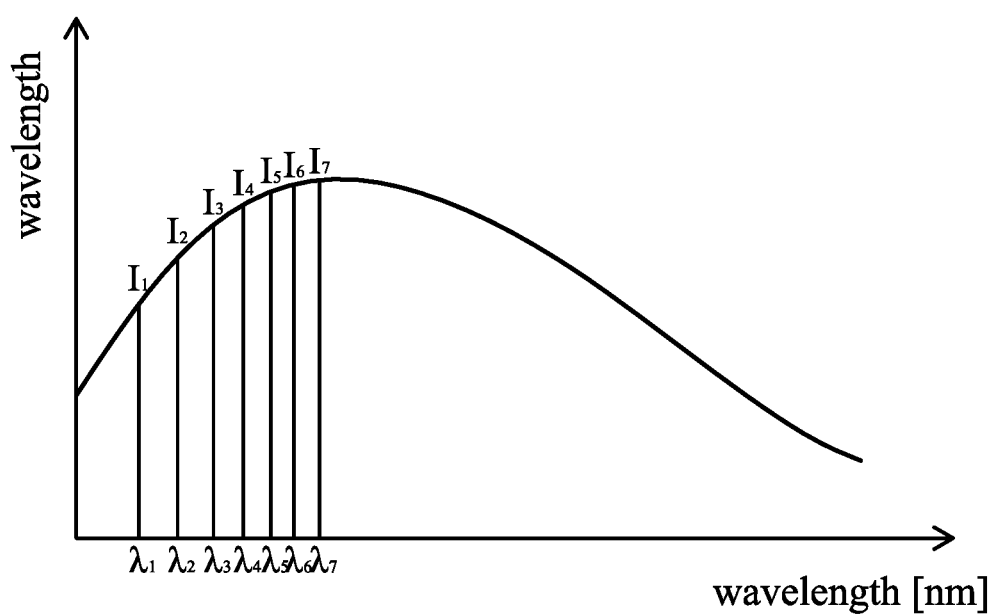
FIG. 7C illustrates a spectrum of a reference light source.

FIGS. 7A, 7B, and 7C illustrate a method of forming a true color photo. FIG. 7A is a spectrum over the spectral range of a certain pixel 40 obtained from the captured N+1 images, wherein the intensity of the certain pixel of the image taken on the condition that all light-emitting diodes or laser diodes do not emit light, is respectively deduced from the intensities of the certain pixel 40 of the N images. In addition, the intensities of the certain pixel 40 of N images (spectral bands) are further calibrated according to the spectral response of the image sensor 32 and emission spectrum of the corresponding light-emitting diodes or laser diodes. FIG. 7B is the spectral sensitivity spectrum of the human eye. FIG. 7C illustrates an emission spectrum of a reference light source. Those plots in FIGS. 7A-7C are just schematics. As shown in FIGS. 7A-7C, the intensities ($b_1$, $b_2$, $b_3$, $b_4$, $b_5$, $b_6$, $b_7$) of the certain pixel 40 corresponding to individual wavelengths ($\lambda_1$, $\lambda_2$, $\lambda_3$, $\lambda_4$, $\lambda_5$, $\lambda_6$, $\lambda_7$ . . . ) of the blue cone are respectively multiplied by the spectral sensitivity of the human eye at corresponding wavelength, and further multiplied by the intensity or relative intensity of the reference light source at corresponding wavelength, and then a blue cone intensity B of the certain pixel can be obtained by adding the results as follows:

$$(S_1 \times b_1 \times I_1 \times S_2 \times b_2 \times I_2 \times S_3 \times b_3 \times I_3 \times S_4 \times b_4 \times I_4 \times S_5 \times b_5 \times I_5 \times S_6 \times b_6 \times I_6 \times S_7 \times b_7 \times I_7 + \ldots ) = B$$

A green cone intensity G of the certain pixel can be obtained using the same operation as follows:

$$(S_3 \times g_1 \times I_3 \times S_4 \times g_2 \times I_4 \times S_5 \times g_3 \times I_5 \times S_6 \times g_4 \times I_6 \times S_7 \times g_5 \times I_7 + \ldots ) G$$

A red cone intensity R of the certain pixel can be obtained using the same operation as follows:

$$(S_6 \times r_1 \times I_6 \times S_7 \times r_2 \times I_7 + \ldots ) = R$$

Then, the chromaticity coordinate of the certain pixel can be obtained by the following formula:

$$x = R/(R+G+B)$$

$$y = G/(R+G+B)$$

$$z = 1-x-y$$

Each pixel is subjected to the above operation to obtain a true color photo, and the scene that the true color photo reveals is very close to what the human eyes see.

The true color photo in the above embodiment is calibrated according to the emission spectrum of a reference light source. The emission spectrum of reference light source may be the emission spectrum of an ambient light at the moment of photographing. Or, it may be a pre-stored, known spectrum, such as a midday solar spectrum, a twilight solar spectrum, a fluorescent lamp spectrum, or an incandescent light spectrum. The spectrum of the reference light source is used to calibrate the image as a true color photo on the reference light source.

The spectrum of the ambient light at the moment of photographing can be obtained, based on the following equation (taking a certain wavelength λ and a certain pixel 40 as an example):

$$I_\lambda(\text{ambient}) = \text{object calibrated spectrum} \times \text{ambient light}(\lambda) \times \text{image sensor}(\lambda),$$

wherein, $I_\lambda$ (ambient) is the intensity of the certain pixel 40 of an image captured by the image sensor 32 on a condition that all N light-emitting diodes (or laser diodes) do not emit light (only the ambient light). The object calibrated spectrum is the intensity of the certain pixel 40 of an image captured by the image sensor 32 on the condition that only the corresponding light-emitting diode (λ) or laser diode (λ) emits the light, and the intensity is further calibrated according to spectral response (λ) of the image sensor 32 and the emission spectrum of the corresponding light-emitting diode (λ) or laser diode (λ). The image sensor (λ) is the spectral response or relative response of the image sensor 32 at the corresponding wavelength (λ). Accordingly, the intensity (λ) of the ambient light of at the moment of photographing, i.e., ambient light (λ), can be obtained after operation.

Accordingly, the spectrum of the ambient light at the moment of capturing the N images can be calculated based on the image captured on the condition that all of the N diodes do not emit light, the captured N images that are further calibrated by a spectral response spectrum of an image sensor capturing the N images and further calibrated by respective emission spectra of the N diodes, and the spectral response spectrum of the image sensor.

The photographs taken by the spectral imaging method and device of embodiments of this invention can not only detect the chemical composition of the photographed object, but also greatly contribute to food safety and environmental protection. The spectral imaging method and device are also effective in accurate color determination of objects, such as clothing, tiles, stained glass, wallpaper, etc.

The intent accompanying this disclosure is to have each/all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention. Corresponding or related structure and methods disclosed or referenced herein, and/or in any and all co-pending, abandoned or patented application(s) by any of the named inventor(s) or assignee(s) of this application and invention, are incorporated herein by reference in their entireties, wherein such incorporation includes corresponding or related structure (and modifications thereof) which may be, in whole or in part, (i) operable and/or constructed with, (ii) modified by one skilled in the art to be operable and/or constructed with, and/or (iii) implemented/made/used with or in combination with, any part(s) of the present invention according to this disclosure, that of the application and references cited therein, and the knowledge and judgment of one skilled in the art.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

All of the contents of the preceding documents are incorporated herein by reference in their entireties. Although the disclosure herein refers to certain illustrated embodiments, it is to be understood that these embodiments have been presented by way of example rather than limitation. For example, any of the particulars or features set out or referenced herein, or other features, including method steps and techniques, may be used with any other structure(s) and process described or referenced herein, in whole or in part, in any combination or permutation as a non-equivalent, separate, non-interchangeable aspect of this invention. Corresponding or related structure and methods specifically contemplated and disclosed herein as part of this invention, to the extent not mutually inconsistent as will be apparent from the context, this specification, and the knowledge of one skilled in the art, including, modifications thereto, which may be, in whole or in part, (i) operable and/or constructed with, (ii) modified by one skilled in the art to be operable and/or constructed with, and/or (iii) implemented/made/used with or in combination with, any parts of the present invention according to this disclosure, include: (I) any one or more parts of the above disclosed or referenced structure and methods and/or (II) subject matter of any one or more of the inventive concepts set forth herein and parts thereof, in any permutation and/or combination, include the subject matter of any one or more of the mentioned features and aspects, in any permutation and/or combination.

Although specific embodiments have been illustrated and described, it will be appreciated by those skilled in the art that various modifications may be made without departing from the scope of the present invention, which is intended to be limited solely by the appended claims.

What is claimed is:

1. A spectral imaging device, comprising:
   a diode array comprising N diodes, wherein N is a positive integer, the N diodes are N light-emitting diodes or N laser diodes, and each of the N diodes emits a light having a wavelength range different from that of other diodes; and
   an image sensor continuously capturing N images of an object or a scene having the object over a spectral range, the spectral range being divided into N spectral bands, each of the N diodes corresponding to one of the N spectral bands, wherein for each capture, the image sensor captures an image over one of the N spectral bands, and only the diode corresponding to the one of the N spectral bands emits light to provide a light source for capturing the image, and the remaining diodes do not emit light, and the image sensor further captures an image of the object or the scene having the object on a condition that all of the N diodes do not emit light;
   wherein each of the spectral bands has a bandwidth equal to or less than 10 nm.

2. The spectral imaging device as recited in claim 1, further comprising:
   a processor that processes and obtains spectra of individual pixels of the object over the spectral range from the captured N+1 images, and then determines the composition of the object according to the spectra.

3. The spectral imaging device as recited in claim 2, wherein the N diodes illuminate in turn and the image sensor captures the N images, and the processor subtracts respective intensities of individual pixels of the image captured by the image sensor on the condition that all of the N diodes do not emit light, from respective intensities of individual pixels of the N images, and then the N images are recombined to get a true color photo.

4. The spectral imaging device as recited in claim 3, wherein the N images are recombined and calibrated by a spectral sensitivity spectrum of human eye and an emission spectrum of a reference light source.

5. The spectral imaging device as recited in claim 1, wherein one or more diodes of the diode array employ an optical coating to reduce their bandwidth.

6. The spectral imaging device as recited in claim 1, wherein each of the one or more diodes of the diode array has a bandwidth of 5 nm or 3 nm.

7. The spectral imaging device as recited in claim 1, wherein one or more diodes of the diode array employ metal nanostructures to reduce their bandwidth.

8. The spectral imaging device as recited in claim 7, wherein the metal nanostructures comprises periodically arranged metal nanowires.

9. The spectral imaging device as recited in claim 1, wherein the spectral imaging device is a mobile phone.

10. The spectral imaging device as recited in claim 9, wherein the diode array is disposed on a device independent of the mobile phone and is electrically connected to the mobile phone.

11. The spectral imaging device as recited in claim 9, further comprising: an application installed in the mobile phone to control an illuminating order of the diode array.

12. A spectral imaging method, comprising the steps of:
   providing a diode array that comprising N diodes, wherein N is a positive integer, the N diodes are N light-emitting diodes or N laser diodes, and each of the N diodes emits a light having a wavelength range different from that of other diodes;
   continuously capturing N images of an object or a scene having the object over a spectral range, wherein the spectral range is divided into N spectral bands, each of the diodes corresponding to one of the N spectral bands, and wherein for each capture, one image is captured over one of the N spectral bands, and only the diode corresponding to the one of the N spectral bands emits light to provide a light source for capturing the image, and the remaining diodes do not emit light;
   capturing an image of the object or the scene having the object on a condition that all of the N diodes do not emit light;
   obtaining spectra of individual pixels of the object over the spectral range from the captured N+1 images; and
   determining the composition of the object according to the spectra.

13. The spectral imaging method as recited in claim 12, further comprising:
   subtracting respective intensities of individual pixels of the image captured on the condition that all of the N diodes do not emit light, from respective intensities of individual pixels of the N images; and
   recombining the N images to form a true color photo.

14. The spectral imaging method as recited in claim 13, wherein the step of forming the true color photo comprises:
   obtaining respective spectra of individual pixels over the spectral range from the captured N images;
   calculating chromaticity coordinates of individual pixels of the true color photo, wherein the chromaticity coordinates of individual pixels are obtained by respectively performing a linear combination of the respective spectra of the individual pixels, a spectral sensitivity spectrum of human eye, and a spectrum of a reference light source.

15. The spectral imaging method as recited in claim 14, wherein the reference light source is a known spectrum.

16. The spectral imaging method as recited in claim 14, wherein the spectrum of the reference light source is a spectrum of an ambient light at the moment of capturing images.

17. The spectral imaging method as recited in claim 16, wherein the spectrum of the ambient light at the moment of capturing images is calculated based on: (1) the image captured on the condition that all of the N diodes do not emit light; (2) the captured N images that are calibrated by a spectral response spectrum of an image sensor capturing the N images and further calibrated by respective emission spectra of the N diodes; and (3) the spectral response spectrum of the image sensor, wherein for a certain pixel and a certain wavelength, an intensity ($\lambda$) of the ambient light at the moment of capturing images is obtain by the following equation:

$$I_\lambda(\text{ambient}) = \text{object calibrated spectrum} \times \text{ambient light } (\lambda) \times \text{image sensor}(\lambda),$$

wherein the ambient light ($\lambda$) denotes the intensity ($\lambda$) of the ambient light at the moment of capturing the images, $I_\lambda$ (ambient) denotes the intensity of the certain pixel of the image captured by the image sensor on the condition that all N diodes do not emit light, the object calibrated spectrum denotes the intensity of the certain pixel of the image captured by the image sensor on the condition that only the corresponding diode ($\lambda$) emits the light and the intensity is further calibrated according to spectral response ($\lambda$) of the image sensor and the emission spectrum of the corresponding diode ($\lambda$), and the image sensor ($\lambda$) is the spectral response or relative response of the image sensor at the corresponding wavelength ($\lambda$).

18. The spectral imaging method as recited in claim 14, wherein before the linear combination, the respective spectra are further calibrated by a spectral response spectrum of an image sensor that captures the N images.

19. The spectral imaging method as recited in claim 14, wherein before the linear combination, the respective spectra are further respectively calibrated by a spectrum of the corresponding diode.

20. The spectral imaging method as recited in claim 12, wherein each of the spectral bands with a bandwidth equal to or less than 10 nm.

* * * * *